United States Patent [19]

Kline

[11] 4,037,227
[45] July 19, 1977

[54] CONTROLLED DECEPTION JAMMING DEVICE

[75] Inventor: Charles R. Kline, Ellicott City, Md.

[73] Assignee: The United States of America as represented by the Secretary of the Air Force, Washington, D.C.

[21] Appl. No.: 541,856

[22] Filed: Apr. 11, 1966

[51] Int. Cl.² .......................... G01S 7/38; H04K 3/00
[52] U.S. Cl. ................................ 343/18 E; 343/6.5 R
[58] Field of Search ................ 343/18 E, 6.5, 6.5 R

[56] References Cited

U.S. PATENT DOCUMENTS

| | | | |
|---|---|---|---|
| 2,824,301 | 2/1958 | Lenell et al. | 343/6.5 |
| 2,962,713 | 11/1960 | Harris et al. | 343/6.5 |
| 3,007,156 | 10/1961 | Barber | 343/6.5 |
| 3,019,433 | 1/1962 | White | 343/18 |

Primary Examiner—Maynard R. Wilbur
Assistant Examiner—Richard E. Berger
Attorney, Agent, or Firm—Joseph E. Rusz; Robert Kern Duncan

[57] ABSTRACT

An electronic countermeasure system that receives a hostile radar tracking signal, re-transmits a return signal with the tracking scan modulation shifted in phase, and increasing in intensity with decreasing received intensity, until the received signal has decreased to the radar's side lobe intensity (approximately a 25 db decrease), then re-transmits (beacons) the hostile radar pulses, thus forcing the radar to track by its side lobe rather than the main lobe resulting in an angular tracking error.

3 Claims, 2 Drawing Figures

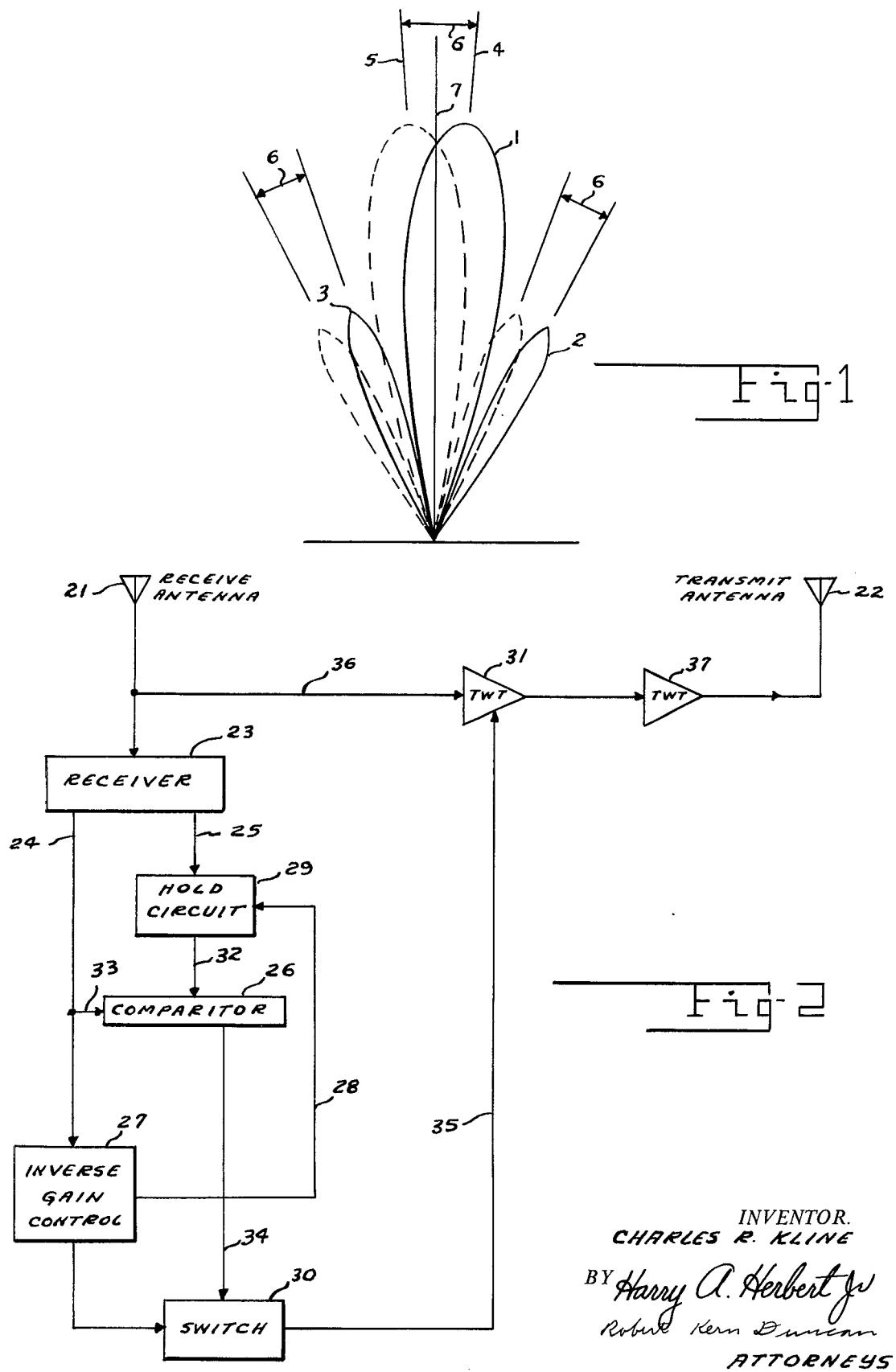

CONTROLLED DECEPTION JAMMING DEVICE

A sequentially lobing tracking radar depends for its operation on the principle that as the antenna beam is nutated or lobed, any target not lying directly on the nutation axis will produce a target return signal which is amplitude modulated at the lobing frequency. The amplitude of the modulation is a function of the distance (in angle) of the target off the nutation axis, and it phase angle is a function of the direction off the nutation axis. This signal modulation is then used by the radar control the radar antenna tracking servo. The antenna may thus be driven angularly until the index line of the radar (the center line bisecting the angle formed by the position of the lobe extremes) falls on the target.

Radar (antenna) side-lobe tracking is normally prevented by the proper selection of the angular error sensing control factor (percentage modulation per degree error) and by the factor that a well designed tracking antenna has side lobes which are generally twenty to thirty db down in intensity from the main beam. The transfer of tracking from the main beam to side lobe beams normally never occurs since there is usually a null between the main lobe of the beam pattern and the adjacent side lobes of the beam.

Previous ECM systems have deceived such a tracking radar, (in addition to the use of jamming noise signals, signals creating multiple false echoes, and the like), by using a signal repeater employing inverse gain techniques. This device detects the lobing modulation of the radar, phase shifts it 180°, and retransmits it back to the radar at a very high signal level with respect to the skin return signal. (The skin return signal is the normal radar echo return signal from the surface of the object being tracked by the hostile radar.) The opposing or hostile radar upon receiving this transmitted deceptive signal demodulates it and in turn its tracking servo is commanded to move the antenna in opposition to the direction to the true target position. The end result is that the opposing radar's antenna is driven completely off the target and angle break lock occurs. With this type of ECM, the opposing radar is continually driven off in angle until a cross-over range is reached wherein the opposing radar's received skin signal from the vehicle bearing the ECM, exceeds in intensity the deception (jamming) signal. At that relatively close range normal tracking can exist and the ECM jammer is ineffective. As conditions of angle break-lock are apparent to a radar operator, an effective radar counter-countermeasure to the foregoing deception technique is to monitor the target in a search mode until such a range is reached that the echo return signal overpowers the jammer. An ECM system that operates effectively and in such a manner that its operation is not discernable by the opposing radar operator is desirable and the provision of such apparatus is an object of this invention.

Another object of this invention is to provide an undetectable deception jamming device that provides smooth tracking of the opposing radar at a large angular bias.

Another object of the present invention is to provide an angular deception signal that encourages the firing of beam rider type missiles at or near their maximum range capability with a resulting very large miss distance.

Another object of the present invention is to provide a deception signal that will command hostile radar systems to misdirect their fire control.

These and other objects of the invention will become apparent when the following description is read in connection with the accompanying drawing in which:

FIG. 1 is a simplified sketch of the lobed radiation (and reception) beam patterns of a sequentially lobing tracking radar system;

FIG. 2 is a block diagram of an embodiment of a controlled deception jamming system.

FIG. 1 illustrates the lobing of a radar antenna. The radiation pattern of the antenna has a major (or main beam) 1 and side lobes 2 and 3. For simplicity additional minor side lobes are not shown. The antenna pattern is lobed from a position (shown by the solid line) pointing along line 4 to a position (shown by the dotted line) pointing along line 5 through the angle 6. Lobing may be accomplished either by mechanical movement of the antenna or by electrical means. The same antenna is generally used for both transmission and reception of the radar pulses. The lobing frequency is low compared to the radar pulse repetition frequency (PRF). Lobing frequencies of approximately 100 cps or lower are common while the PRF usually is several kilocycles. Thus target returns are modulated at the lobing frequency as the beam is swept over the target, and as previously stated this signal modulation is used by the radar system to control the aiming of the antenna until the target return is centered on the index line of the radar 7. It is apparent that an aircraft or other vehicle having suitable receiving and detecting equipment can sense that he is under surveillance by an opposing radar and transmit a modulated signal of greater intensity than the returning echo from his craft such that his transmitted signal will "swamp out" the echo and effectively take control of the opposing radar's guidance system. By using a modulated signal 180° out of phase with the signal that would normally return as an echo, the opposing radar's antenna is driven to the left when in actuality it should move to the right to center on the target. As previously stated this action will continue through the main beam scanning angle and all the side beams until the antenna is pointed so far off the target that the signal contact is lost and break-lock occurs. The foregoing action and the equipment to accomplish it is relatively old and well known in the art.

The invention set forth herein detects when the opposing radar's antenna has been driven through such an angle that the sweep of the main base is no longer illuminating the target, (i.e. the friendly vehicle, or aircraft, bearing the ECM) and that the target is now being swept by a side lobe of the beam; at this point further movement off the target by the opposing radar is halted and the opposing radar then tracks the target through the side lobe, unknowningly to the system or attendant operator, giving a false indication of the target's angular position. The technique and apparatus disclosed herein to accomplish the foregoing is an improvement in the inverse gain device described above in that the return signal is controlled so as to drive the hostile radar antenna to a position where its side lobes illuminate the target and at that time the retransmitting of inverse gain modulation is terminated and the ECM retransmits as a repeater or true beacon. The beacon signal is of sufficient strength that the hostile radar maintains angle track on one of its side lobes, thus tracking very smoothly with a large angular bias. Most important, however, is the fact that this can be accomplished without the radar operator realizing it, and consequently he is induced to launch beam rider type missiles and other destructive devices at their maximum range capability. Under these conditions a radar angular error in excess of the main lobe beam width provides a very large miss distance.

FIG. 2 is a block diagram showing the combination of well-known individual circuitry to provide controlled angle deception. As in prior art inverse gain ECM devices, a receiving antenna 21 picks up the radiation from the hostile lobe switching radar, and antenna 22 transmits back to that radar deceptive signals. Receiver 23 is a conventional receiver used by inverse gain ECM devices with the following improved modification. Output 24 is the normal high level conventional output from the receiver; output 25 is an additional output having the same characteristics as output 24 except it is padded down, or attenuated in amplitude level. The amount in db that output 25 is attenuated below the level of conventional output 24 is made a function of the difference magnitude between the desired side lobe and the main beam of the hostile radar. This value may be determined by previous measurement or arbitrarily set at a representative value. For instance, with current state of the art hostile lobe tracking radars, a value for second side-lobe tracking is approximately 25 db to 30 db down. Signal attenuation devices are well known. "L" pads and "T" pads are typical examples of attenuation networks that may be used and such attenuation circuits are generally present in ECM receivers.

The normal output 24 of the receiver is coupled to a voltage comparator 26 and to the conventional inverse gain control circuitry 27. When the inverse gain circuits 27 are activated by a signal from the receiver indicating that a lobing radar is tracking the ECM equipped aircraft (or other vehicle) a trigger signal is sent on line 28 to the hold circuit 29. This trigger signal may be a voltage pulse or voltage step initiated by the activation of the inverse gain control circit. The hold circuit 29 then stores, attenuated, the signal level being received at that time (i.e., at the start of the deception process) on line 25 from receiver 23. This is previously stated a level padded down in magnitude a determined amount from that on the normal receiver output level on line 24. Voltage storage circuits have been common in the art for many years. The inverse gain modulation is applied through the normally closed switch 30 to amplitude modulate a traveling wave tube (TWT) 31 in the r-f loop in phase opposition to the received lobing modulation in the conventional manner.

As the hostile radar antenna is driven off of the target axis, the output of the ECM receiver 23 decreases. After a short period of time the amplitude of the currently received signal on line 24 has progressively decreased until it equals the stored signal amplitude in the hold circuit 29, which was derived by attenuating the initially received signal. The comparator 26 which receives both these signals, (i.e., the stored signal through the line 32 and the signal currently being received on line 33), at that time sends an activating signal on line 34 to open the conventional electronic switch 30 removing the inverse gain control output on line 35 to the grid of the TWT 31. Thus the inverse gain modulation is disconnected from the r-f loop, and the loop merely beacons (amplifies and retransmits at a higher level the received radar signal). The beaconing thus occurs at such a time that a slide lobe of the hostile radar is illuminating the target and the beacon signal causes the hostile radar to track the target on a given side lobe, with target return signal strengths comparable in level with what would be expected from main lobe echoes. The capability for beaconing action is a function of conventional ECM apparatus and it is obtained in this embodiment in the conventional manner through the coupling of the receiving antenna to TWT 31 by line 36. An additional TWT tube 37 is conventionally used to obtain further amplification.

In implementing this improved ECM apparatus into an ECM bearing vehicle it is to be understood that equipment as is used with conventional inverse gain ECM equipment will be used. This would include a standard signal analysis unit for initiating the deception system once it has been detected that a radar is tracking the ECM protected aircraft. Also the signal analysis unit would automatically turn the deceptive device off when the received signal level falls below the side-lobe beacon threshold to prevent the repeater from beaconing on unwanted signals.

In an operating embodiment of this invention an advanced interceptor radar was caused to track on its first side-lobe with a fixed bias error in excess of five degrees. Smooth tracking occurred and no indication of the jamming taking place was present except that a visual sighting of the target down the boresight axis of the antenna disclosed that it was tracking with a fixed angular error. In this embodiment with a greater attentuation inserted in the signal furnished the hold circuit, second side lobe deception instead or first side lobe provides an angular estimated error in excess of ten degrees.

It will be understood that various changes and departures from the description and illustrations of the invention as set forth herein will be made by those skilled in the art within the principle and scope of the invention as expressed in the appended claims.

What is claimed is:

1. A method of creating a deceptive angle indication in a radar of the sequentially lobing angle tracking type, which method comprises: receiving the lobe tracking radar signals at a normal level; detecting the lobing modulation of the radar; shifting the phase of the modulation 180 degrees; retransmitting at a high level the radar signal with the phase shifted modulation; attenuating the initially received radar signal a predetermined amount; storing the attenuated signal; comparing over a period of time the stored signal level with the signal level being received; terminating the retransmitting of the phase shifted signals when the stored signal level and the received signal levels are approximately equal; and beaconing the received radar signal after the termination of transmitting the phase shifted signal.

2. The method as claimed in claim 1 wherein the said predetermined amount of attenuation is approximately twenty-five db.

3. The improvement in inverse gain signal repeater electronic countermeasure apparatus for providing in an opposing tracking radar system a false tracking angle indication, the system to be improved having signal beaconing means for retransmitting a radar signal including signal receiving means with a first signal level output means and with a second signal level output means attenuated to approximately a 25 db lower level than the first output means, and with inverse gain modulation control means cooperating with the said beaconing means for providing a phase shifted increasing in intensity retransmitted signal with a decreasing in intensity received signal, the said improvement comprising:

a. signal holding means responsive to the said inverse gain control means cooperating with the said second signal level output of the said receiving means for holding the said second signal level and providing an output;
b. comparator means cooperating with the said first signal level output means of the said receiving means and with the output of the signal holding means for providing an output when the said first signal level output of the receiving means has decreased to the level of the said held signal; and
c. switch means responsive to the output of the said comparator means for disconnecting the inverse gain control modulation from the said beaconing means.

* * * * *